US010208224B2

(12) United States Patent
Song et al.

(10) Patent No.: US 10,208,224 B2
(45) Date of Patent: Feb. 19, 2019

(54) INTERLAYER COMPOSITION FOR ELECTRONIC PRINTING

(71) Applicant: XEROX CORPORATION, Norwalk, CT (US)

(72) Inventors: Guiqin Song, Milton (CA); Nan-Xing Hu, Oakville (CA); Ping Liu, Mississauga (CA); Biby Esther Abraham, Mississauga (CA); Cuong Vong, Hamilton (CA)

(73) Assignee: XEROX CORPORATION, Norwalk, CT (US)

( * ) Notice: Subject to any disclaimer, the term of this patent is extended or adjusted under 35 U.S.C. 154(b) by 204 days.

(21) Appl. No.: 15/164,669

(22) Filed: Jun. 13, 2016

(65) Prior Publication Data
US 2017/0355871 A1  Dec. 14, 2017

(51) Int. Cl.
| | |
|---|---|
| *B32B 17/10* | (2006.01) |
| *B32B 27/42* | (2006.01) |
| *C08L 29/14* | (2006.01) |
| *C09D 11/52* | (2014.01) |
| *C09D 11/103* | (2014.01) |
| *C09D 129/04* | (2006.01) |
| *C09D 129/14* | (2006.01) |
| *C08J 7/04* | (2006.01) |
| *C08L 61/28* | (2006.01) |
| *C08L 63/00* | (2006.01) |
| *C09D 161/28* | (2006.01) |
| *C09D 163/00* | (2006.01) |
| *B32B 7/12* | (2006.01) |
| *C09D 11/10* | (2014.01) |
| *C09D 11/106* | (2014.01) |

(52) U.S. Cl.
CPC ............ *C09D 129/14* (2013.01); *B32B 7/12* (2013.01); *B32B 27/42* (2013.01); *C08J 7/045* (2013.01); *C08L 29/14* (2013.01); *C08L 61/28* (2013.01); *C08L 63/00* (2013.01); *C09D 11/10* (2013.01); *C09D 11/103* (2013.01); *C09D 11/106* (2013.01); *C09D 11/52* (2013.01); *C09D 161/28* (2013.01); *C09D 163/00* (2013.01); *C08J 2367/02* (2013.01); *C08J 2429/14* (2013.01); *C08J 2461/28* (2013.01); *C08J 2463/00* (2013.01); *C08L 2205/03* (2013.01)

(58) Field of Classification Search
USPC .......................... 428/426, 480, 437; 524/440
See application file for complete search history.

(56) References Cited

U.S. PATENT DOCUMENTS 3,226,256 A * 12/1965 Schneble, Jr. ........ H01H 19/585
427/306
5,118,657 A * 6/1992 Kawakami ......... B41M 5/38228
428/212
2004/0186217 A1 * 9/2004 Pelosi .................... C08L 29/14
524/505
2009/0126984 A1 * 5/2009 Saneto ................. H05K 9/0096
174/350
2012/0043512 A1 * 2/2012 Liu ....................... B41M 3/006
252/519.21

(Continued)

FOREIGN PATENT DOCUMENTS

CN         103589269 B      4/2016
GB           693051    *    6/1953

OTHER PUBLICATIONS

Song et al., "Interlayer Composition for Electronic Printing," U.S. Appl. No. 14/981,419, filed Dec. 28, 2015.

(Continued)

*Primary Examiner* — Tae H Yoon
(74) *Attorney, Agent, or Firm* — MH2 Technology Law Group LLP

(57) ABSTRACT

The present disclosure is directed to a composition including a polyvinyl butyral represented by the following formula:

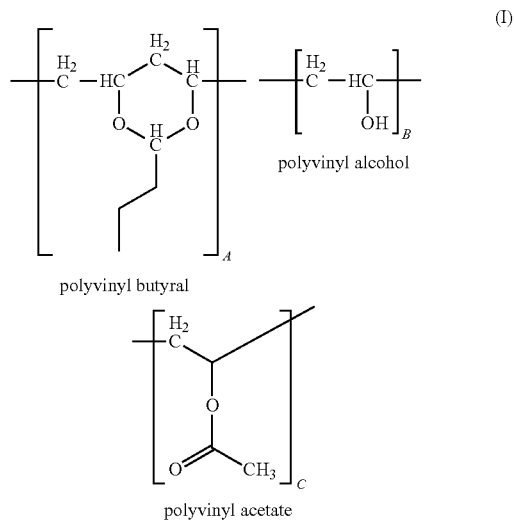

wherein A, B and C represent a proportion of corresponding repeat units expressed as a weight percent, wherein each repeat unit is randomly distributed along a polymer chain and wherein the sum of A, B and C is about 100 weight percent; a poly(melamine-co-formaldehyde) based polymer and an anhydride. Devices coated with the composition and cured films formed from the composition comprising conductive features are also provided.

20 Claims, 5 Drawing Sheets

(56) References Cited

U.S. PATENT DOCUMENTS

2014/0374672 A1    12/2014  Chopra et al.
2017/0233541 A1*   8/2017   Wu .......................... C08J 7/045
                                                        427/455

OTHER PUBLICATIONS

Eastman Chemical Company, 2013, "Butvar®, Polyvinyl Butyral Resins, Properties and Uses", pp. 1-30.
Extended European Search Report dated Oct. 4, 2017 in corresponding European Application No. 17172581.5, 11 pages.

\* cited by examiner

INTERLAYER COMPOSITION FOR ELECTRONIC PRINTING

BACKGROUND

Solution processable conducting materials including metal nanoparticle inks play an important role in electronic device integrations. Silver nanoparticle inks, for example, can be easily dispersed in suitable solvents and used to fabricate various conducting features in electronic devices such as electrodes and electrical interconnectors by low-cost solution deposition and patterning techniques including ink jet printing technologies.

However, the conductive features formed from metal nanoparticle inks on suitable substrates must have sufficient adhesion and mechanical robustness characteristics to enable proper electronic device fabrications and functions. Unfortunately, adhesion of metal nanoparticle inks on certain substrates, such as glasses and polyimide, may not always be adequate for robust device fabrications.

The possibility of inadequate adhesion was tackled previously by adding a small amount of polymeric materials, such as polyvinyl butyral (PVB) resin, into silver conducting inks as an adhesion promoter. While this approach is suitable for some applications, a potential disadvantage of this method is that the electrical conductivity of printed conductive features from such inks could, in some instances, be decreased significantly. Therefore, it is desirable to develop effective methods to improve adhesion and enable formation of devices with robust mechanical properties without sacrificing electric conductivity of conducting materials, such as metal nanoparticle inks, which are used in electronic device applications.

SUMMARY

The present disclosure is directed to a composition including a polyvinyl butyral represented by the following formula:

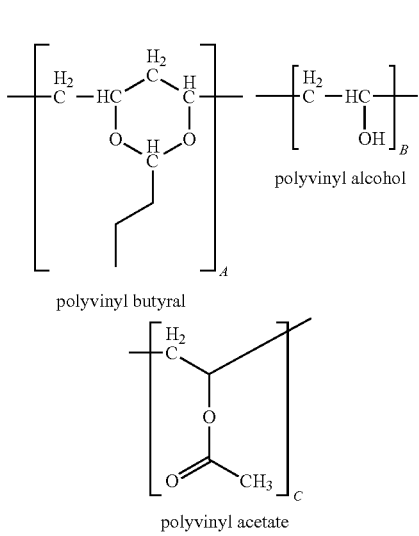

wherein A, B and C represent a proportion of corresponding repeat units expressed as a weight percent, wherein each repeat unit is randomly distributed along a polymer chain and wherein the sum of A, B and C is about 100 weight percent, a poly(melamine-co-formaldehyde) based polymer and an anhydride.

The disclosure also provides a device including a substrate; an interlayer; and conductive features, wherein the interlayer includes a cured film formed from a composition including a polyvinyl butyral resin represented by the following formula:

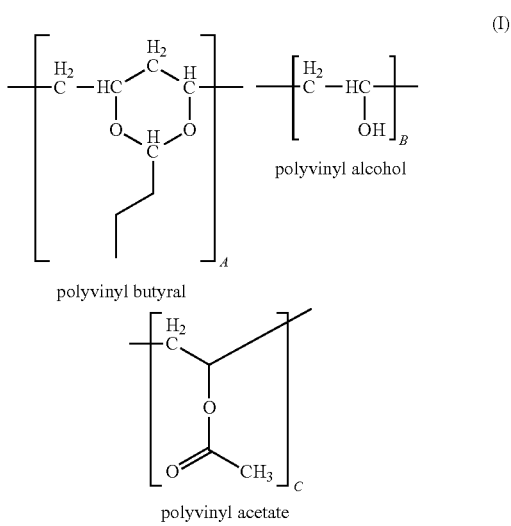

wherein A, B and C represent a proportion of corresponding repeat units expressed as a weight percent, wherein each repeat unit is randomly distributed along a polymer chain and wherein the sum of A, B and C is about 100 weight percent, a poly(melamine-co-formaldehyde) based polymer and an anhydride.

Also provided herein is a cured film formed from a composition comprising a polyvinyl butyral represented by the following formula:

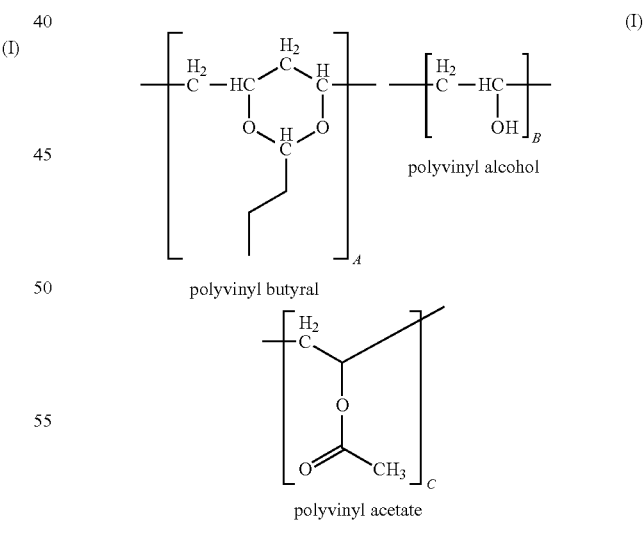

wherein A, B and C represent a proportion of corresponding repeat units expressed as a weight percent, wherein each repeat unit is randomly distributed along a polymer chain and wherein the sum of A, B and C is about 100 weight percent, a poly(melamine-co-formaldehyde) based polymer and an anhydride, wherein the cured film comprises conductive features.

DETAILED DESCRIPTION

Compositions

Figure 1A:
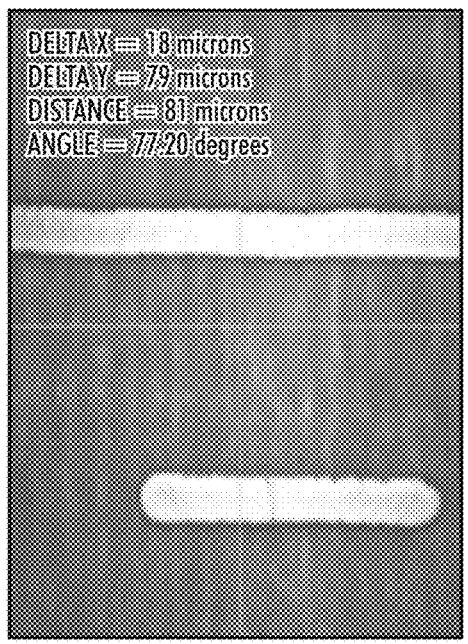
FIG. 1A depicts a printed silver ink line image on an uncoated glass substrate.

The present disclosure provides compositions, which can be employed for any suitable or desired application including, for example, printable sensors or other electronic circuit devices. More particularly, the present disclosure provides a composition, which may be used to form an interlayer between substrates and printed conducted layers, constructed from various conductive compositions, such as metal ink compositions, e.g., XEROX® silver nanoparticle inks. The present composition can dramatically improve the adhesion between the substrates and conductive layers. Furthermore, devices incorporating the present composition exhibit surprisingly improved conductivity. Accordingly, the interlayer formed from the present compositions has surprisingly excellent insulative properties. Moreover, the present compositions do not require costly materials that are commercially difficult to obtain in large supply, such as polyvinyl phenol.

In some embodiments, the present interlayer composition comprises a mixture of a polyvinyl butyral, a poly (melamine-co-formaldehyde) based polymer and an anhydride as described herein. The instant compositions may also optionally include an epoxy resin, a surface additive to control wetting and spreading properties of the present compositions and/or a catalyst to enhance the curing process of the composition deposited on a substrate. In some embodiments, the present interlayer compositions do not contain polyvinyl phenol.

Polyvinyl Butyral

As used herein, "polyvinyl butyral", refers to a product obtained from the hydrolysis of polyvinyl acetate to form polyvinyl alcohol or a polyvinyl alcohol polymer containing residual vinyl acetate groups; the resulting polyvinyl alcohol product being reacted with butyraldehyde under acidic conditions to form a polyvinyl butyral containing various amounts of acetate, alcohol and butyraldehyde ketal groups. In some embodiments, the polyvinyl butyral is in the form of a powder or a pellet. Methods of preparing polyvinyl butyral are known in the art and are described for example in U.S. Patent Publication No. 2012/0043512, which is herein incorporated by reference in its entirety.

Polyvinyl butyral for use in the present composition may be represented by the following formula:

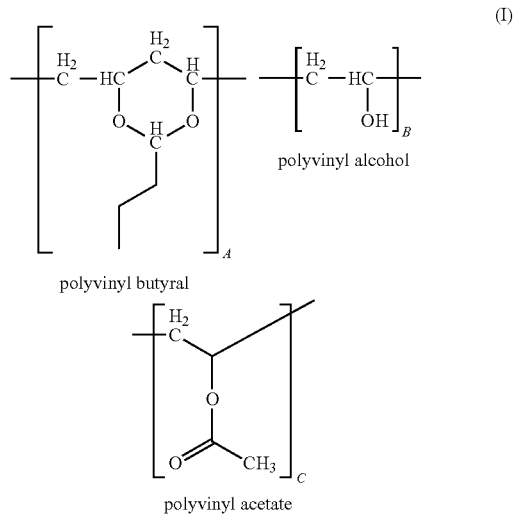

wherein A, B and C represent a proportion of the corresponding repeat units expressed as a weight percent, wherein each repeat unit is randomly distributed along a polymer chain, and wherein the sum of A, B and C is about 100 weight percent.

In some embodiments, A is independently about 70 weight percent to about 95 weight percent, about 75 weight percent to about 90 weight percent, or about 80 weight percent to about 88 weight percent; B is independently about 5 weight percent to about 25 weight percent, about 7 weight percent to about 20 weight percent or about 11 weight percent to about 18 weight percent, such as about 17.5 weight percent; C is independently about 0 weight percent to about 10 weight percent, about 0 weight percent to about 5 weight percent or about 0 weight percent to about 3 weight percent, such as about 2.5 weight percent.

In some embodiments, the polyvinyl butyral of Formula I has an average molecular weight ($M_n$) of about 10,000 to about 300,000 Daltons (Da), about 40,000 to about 200,000 Da or about 25,000 to about 150,000 Da. A representative composition of the polyvinyl butyral constitutes, on a weight basis, about 11% to 25% hydroxyl groups, calculated as polyvinyl alcohol, about 0% to about 2.5% acetate groups calculated as polyvinylacetate, with the balance being vinyl butyral groups, for example, about 80 wt. % to about 88 wt. %.

Suitable polyvinyl butyral for use with the present interlayer compositions are commercially available and include, for example, BUTVAR® B-79 (available from Monsanto Chemical Co., St. Louis, Mo.) having a polyvinyl butyral content of about 88 wt. %, a polyvinyl alcohol content of about 11.0 wt. % to about 13.5 wt. %, and a polyvinyl acetate content of less than about 2.5 wt. %, wherein the average molecular weight of BUTVAR® B-79 is from about 50,000 to about 80,000 Da. More typically, BUTVAR® B-76 (Monsanto Chemical Co.) is used in the present interlayer composition. BUTVAR® B-76 has a polyvinyl butyral content of about 88% by weight, a polyvinyl alcohol content of about 11.5 wt. % to about 13.5 wt. % and a polyvinyl acetate content of less than about 2.5 wt. %, with an average molecular weight of about 90,000 to about 120,000 Da.

The polyvinyl butyral can be provided in the composition in any suitable or desired amount. The amount of the polyvinyl butyral present in the instant interlayer composition in accordance with the present disclosure ranges from about 1 wt. % to about 20 wt. %, including from about 1 wt. % to about 10 wt. %, and from about 1 wt. % to about 5 wt.5%, based on the total weight of the instant interlayer composition.

Melamine-Formaldehyde Based Polymer

In some embodiments, the present composition further includes a cross-linking agent, such as a melamine-formaldehyde based polymer. As used herein, the term "melamine-formaldehyde based polymer" refers to polymers formed by a condensation reaction of melamine (1,3,5-triazine-2,4,6-triamine) with formaldehyde ($CH_2O$). In some embodiments, the free hydroxyl groups of the polyvinyl butyral bond with the melamine-formaldehyde based polymer. Thus, the polyvinyl butyral may be substituted with or "cross-linked" by the melamine-formaldehyde based polymer.

Any suitable or desired melamine-formaldehyde based polymer may be included in the present composition. In some embodiments, the poly(melamine-co-formaldehyde) based polymer is represented by the following chemical structure:

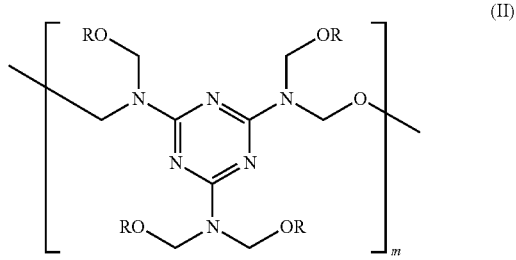

(II)

where R is independently selected from hydrogen (H) and an alkyl, such as methyl, ethyl, propyl, isopropyl, butyl, pentyl, hexyl, and isomers thereof, and m is a number of repeats of the poly(melamine-co-formaldehyde). For example, m may be a number between about 1 and about 10. As a non-limiting example, the number molecular weight (Mn) range for the poly(melamine-co-formaldehyde) based polymer may be between about 300 grams/mole and about 1,500 grams/mole. Suitable poly(melamine-co-formaldehyde) based polymers may be obtained commercially from Sigma-Aldrich, Inc. (Saint Louis, Mo.), a subsidiary of Merck KGaA.

In another embodiment, the melamine-formaldehyde based polymer is an acrylated melamine-formaldehyde based polymer, represented by the following Formula III, wherein "m" is the number of repeats of the poly(melamine-co-formaldehyde), such as between 1 and 10, and R is H, $CH_3$ or $C_4H_9$.

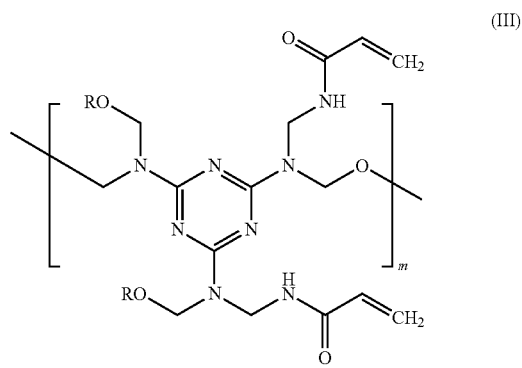

(III)

Acrylated melamine-formaldehyde based polymers are commercially available from Sigma-Aldrich, Inc., for example, and may have a molecular weight between about 390 grams/mole and about 1,500 grams/mole.

In some embodiments, the poly(melamine-co-formaldehyde) based polymer is selected from the group consisting of methylated poly(melamine-co-formaldehyde), butylated poly(melamine-co-formaldehyde), isobutylated poly(melamine-co-formaldehyde), acrylated poly(melamine-co-formaldehyde), methylated/butylated poly(melamine-co-formaldehyde), and combinations thereof.

The poly(melamine-co-formaldchyde) based polymer can be provided in the interlayer composition in any suitable or desired amount. In some embodiments, the poly(melamine-co-formaldehyde) polymer is present in an amount of from about 0.5 percent to about 15 percent, or from about 1 percent to about 10 percent, or from about 1 percent to about 5 percent, by weight, based on the total weight of the interlayer composition.

Anhydrides

In some embodiments, the present composition further includes an anhydride, such as an acid anhydride. In certain embodiments, the anhydride functions as a catalyst/accelerator to enhance the curing process. In other embodiments, the anhydrides of the present disclosure may become covalently incorporated into the cured resin composition.

Any suitable or desired anhydride can be selected for embodiments herein. Typical anhydrides include acetic anhydride, phthalic anhydride, fluorophthalic anhydride and unsaturated dicarboxylic acid anhydride. Examples of suitable unsaturated dicarbo anhydride include maleic anhydride, citraconic anhydride, itaconic anhydride and aconitic anhydride.

One or more anhydrides can be provided in the composition in any suitable or desired amount. In some embodiments, anhydride is present in an amount of from about 0.01 to about 10 percent, or from about 0.1 percent to about 5 percent, or from about 0.1 percent to about 3 percent, by weight, based on the total weight of the interlayer composition. Suitable acid anhydrides are commercially available and may be obtained from Sigma-Aldrich Inc., for example.

Epoxy Resins

In some embodiments, the present composition, optionally, further includes epoxy resins. The epoxy resin component may be any type of epoxy resin, including any material containing one or more reactive oxirane groups (also termed epoxy groups) as shown below.

glycidyl-amine epoxy resins and glycidyl-ester epoxy resins. Glycidyl epoxy resins are commercially available or may be prepared via a condensation reaction of an appropriate dihydroxy compound and epichlorohydrin as is known in the art.

In some embodiments, the present compositions include non-glycidyl epoxy resins, such as cycloaliphatic epoxy resins. Non-glycidyl epoxies are commercially available or may be formed by peroxidation of an olefinic double bond as known in the art.

Suitable epoxy resins include those having aromatic moieties. Representative glycidyl-ether epoxy resins having aromatic moieties include diglycidyl ethers of bisphenol-A (DGEBA) which is synthesized by reacting bisphenol-A with epichlorohydrin in the presence of a basic catalyst and which has the following structure.

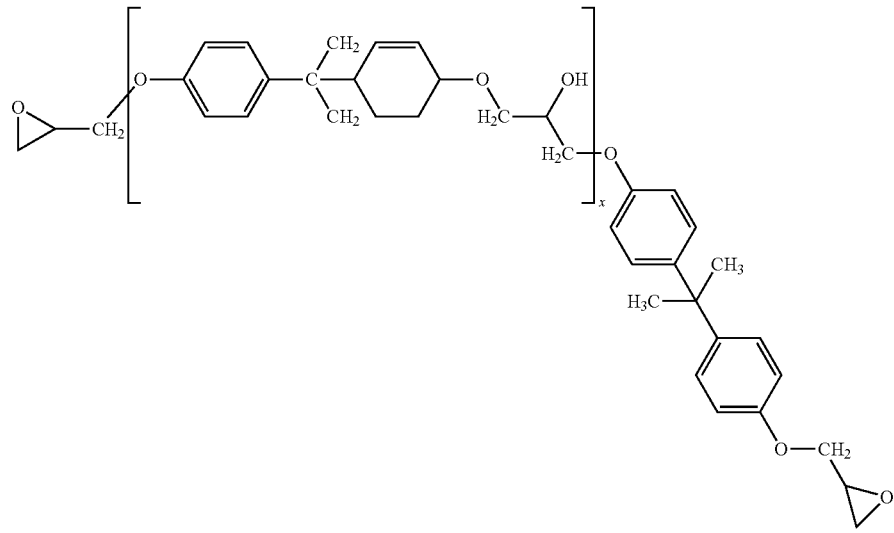
(IV)

Epoxy resins useful in embodiments disclosed herein may include aromatic, aliphatic or heterocyclic epoxy resins. The epoxies may be pure compounds or mixtures of compounds containing one, two or more epoxy groups per molecule. In some embodiments, epoxy resins may also include reactive —OH groups, which may react with the anhydrides, for example, to result in additional crosslinking at higher temperatures, such as the curing temperatures described herein.

In some embodiments, the present compositions include glycidyl epoxy resins, such as glycidyl-ether epoxy resins, Typically, x, the number of repeating units, ranges from 0 to 25.

DGEBA resins are commercially available and are marketed under the trade designations EPON™ 828, EPON™ 1001, EPON™ 1004, EPON™ 2004, EPON™ 1510, and EPON™ 1310 from Hexion, Inc., Columbus, Ohio and D.E.R.™ 331, D.E.R.™ 332, D.E.R.™ 334, and D.E.R.™ 439, available from Dow Chemical Co., Midland, Mich.

Other suitable bisphenol-A epoxy resins include Bisphenol A propoxylate diglycidyl ether, which is also commercially available, e.g., from Sigma-Aldrich, Inc. and which has the following structure:

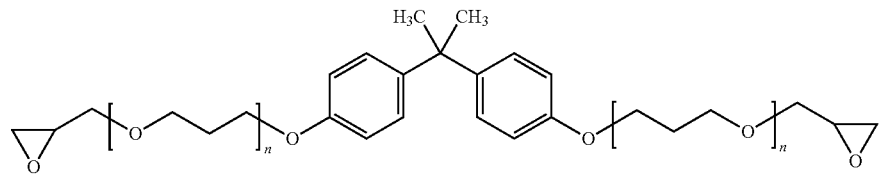
(V)

wherein n=1.

Other suitable glycidyl ether epoxy resins comprising aromatic moieties include bis(4-hydroxyphenyl)methane (known as bisphenol F) and diglycidyl ether of bromobisphenol A (2,2-bis(4-(2,3-epoxypropoxy)3-bromo-phenyl) propane). Bisphenol-F based epoxy resins are commercially available, e.g., D.E.R.™ 354 and D.E.R.™ 354LV, each available from The Dow Chemical Company, Midland, Mich.

Additional glycidyl ether epoxy resins comprising aromatic moieties that may be used with the instant compositions include phenol and cresol novolacs. As is known in the art, these epoxies may be prepared by reacting phenols or cresols, in excess, with formaldehyde in the presence of an acidic catalyst to produce phenolic novolac resin. Novolac epoxy resins are then synthesized by reacting the phenolic novolac resin with epichlorohydrin in the presence of sodium hydroxide as a catalyst. A representative phenol novalac is depicted below, wherein "n" is a number of repeat units, such as from 0 to 5.

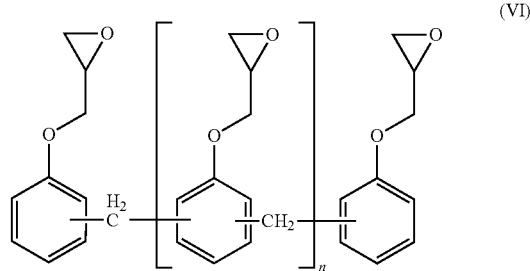

(VI)

Examples of epoxy phenolic novolac resins including epoxy bisphenol A novolac resins useful in some embodiments disclosed herein include those available under the tradenames D.E.N.™ 431 and D.E.N.™ 438 from The Dow Chemical Company, Midland, Mich., and EPON™ SU-8, available from Hexion Specialty Chemicals, Columbus, Ohio.

Other suitable epoxy resins containing aromatic groups include those that can be prepared by the reaction of aromatic alcohols such as biphenyl diols and triphenyl diols and triols with epichlorohydrin. One representative compound is tris-(hydroxyl phenyl)methane-based epoxy available from Huntsman Corporation, Basel, Switzerland as Tactix™ 742.

Additional suitable expoxy resins include glycidal amines. Glycidal amines are formed by reacting epichlorohydrin with an amine, such as an aromatic amine. An example of a suitable glycidal amine is tetraglycidyl methylene dianiline, which is represented by the following structure:

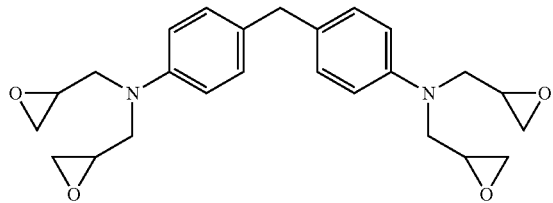

(VII)

Additional suitable epoxy resins include aliphatic epoxy resins. Aliphatic epoxy resins are known in the art and include glycidyl epoxy resins and cycloaliphatic epoxides. Glycidyl aliphatic epoxy resins are typically formed by the reaction of epichlorohydrin with aliphatic alcohols or polyols to give glycidyl ethers or aliphatic carboxylic acids to give glycidyl esters. This reaction is normally done in the presence of an alkali, such as sodium hydroxide, to facilitate the dehydrochlorination of the intermediate chlorohydrin. These resins generally display low viscosity at room temperature (10-200 mPa·s). Typical glycidyl aliphatic epoxy resins for use in the present interlayer composition include trimethylolpropane triglycidyl ether, neopentyl glycol diglycidyltEther and poly(propylene glycol) diglycidyl ether, which are commercially available, for example, from Sigma-Aldrich, Inc.

Cycloaliphatic epoxides may also be included in the present compositions. Cycloaliphatic epoxides contain one or more cycloaliphatic rings in the molecule to which an epoxide ring is fused. They are formed by the reaction of cyclo-olefins with a peracid, such as peracetic acid. Cycloaliphatic epoxides suitable for use in preparing the instant composition include 3,4-epoxycyclohexylmethyl-3,4-epoxycyclohexane carboxylate, bis(3,4-epoxycyclohexylmethyl)adipate, vinyl cyclohexane dioxide and the like and are commercially available from, for example, Union Carbide Corporation, a subsidiary of the Dow Chemical Company, Houston, Tex.

One or more epoxy resins can be provided in the composition of the disclosure in any suitable or desired amount. In embodiments, epoxy resin is present in an amount of from about 0 to about 40 percent, or from about 5 to about 35 percent, or from about 10 to about 25 percent, by weight, based on the total weight of the present composition.

Surfactants

Any suitable or desired surfactant can be included in the present interlayer compositions. In embodiments, the surfactant is selected from the group consisting of a silicone modified polyacrylate, a polyester modified polydimethylsiloxane, a polyether modified polydimethylsiloxane, a polyacrylate modified polydimethylsiloxane, a polyester polyether modified polydimethylsiloxane, a low molecular weight ethoxylated polydimethylsiloxane, polyether modified polydimethylsiloxane, polyester modified polymethylalkylsiloxane, polyether modified polymethylalkylsiloxane, aralkyl modified polymethylalkylsiloxane, polyether modified polymethylalkylsiloxane, polyether modified polydimethylsiloxane and combinations thereof.

For example, the surfactant may be a polysiloxane copolymer that includes a polyester modified polydimethylsiloxane, commercially available from BYK-Chemie GmbH, Wesel, Germany with the trade name of BYK® 310; a polyether modified polydimethylsiloxane, commercially available from BYK-Chemie GmbH with the trade name of BYK® 330; a polyacrylate modified polydimethylsiloxane, commercially available from BYK Chemical with the trade name of BYK®-SILCLEAN 3700 (about 25 weight percent in methoxypropylacetate); or a polyester polyether modified polydimethylsiloxane, commercially available from BYK-Chemie GmbH with the trade name of BYK® 375. The surfactant can also be a low molecular weight ethoxylated polydimethylsiloxane with the trade name SILSURF® A008 available from Siltech Corporation, Ontario, Canada. Some other examples of suitable surfactants include BYK® 3500, BYK® 3510, BYK® 307, BYK® 333, BYK® ANTI-TERRA-U100, BYK® A-004, BYK® C-409.

One or more surfactants can be provided in the composition of the disclosure in any suitable or desired amount. In some embodiments, the surfactant is present in an amount of from about 0.01 to about 5 percent, from about 0.1 to about 3.5 percent, or from about 0.5 to about 2 percent, by weight, based on the total weight of the present composition.

Catalysts

The composition of the present disclosure can optionally comprise a catalyst to enhance the curing process. Any suitable or desired catalyst can be selected for use in the present compositions. In embodiments, the catalyst is selected from the group consisting of amine salts of dodecylbenzene sulfonic acid (DDBSA), para toluene sulfonic acid, triflouromethane sulfonic acid, and combinations thereof.

One or more catalysts can be provided in the present composition in any suitable or desired amount. In embodiments, the catalyst is present in an amount of from about 0.05 to about 1.5 percent, or from about 0.08 to about 1.0 percent, or from about 0.1 to about 0.5 percent, by weight, based on the total weight of the instant composition.

Solvents

Any suitable or desired solvent can be selected for the present interlayer compositions. In some embodiments, the solvent is selected from the group consisting of propylene glycol methyl ether acetate, toluene, methyl isobutyl ketone, butylacetate, methoxypropylacetate, xylene, tripropyleneglycol monomethylether, dipropyleneglycol monomethylether, propoxylated neopentylglycoldiacrylate, and combinations thereof.

One or more solvents can be included in the present composition in any suitable or desired amount. In some embodiments, the solvent is present in an amount of from about 50 to about 90 percent or from about 60 to about 80 percent or from about 70 to about 80 percent, by weight, based on the total weight of the composition in accordance with the present disclosure.

Percent Solids

In some embodiments, the present composition comprises from about 10 to about 50 weight percent solids, or from about 15 to about 40 weight percent solids, or from about 20 to about 30 weight percent solids, based on the total weight of the composition in accordance with the present disclosure. In specific embodiments, the present composition contains a selected solids content of less than about 30 weight percent solids, based on the total weight of the instant composition. For example, in some embodiments, the present composition contains a solids content of from about 10 to less than about 30 weight percent solids, or from about 15 to less than about 30 weight percent solids, or from about 20 to less than about 30 weight percent solids, based on the total weight of the composition in accordance with the present disclosure.

Devices

The instant disclosure is also directed to a device including a substrate, an interlayer disposed thereover, and a conductive composition disposed over the interlayer. The substrate may be any suitable substrate including silicon, a glass plate, a plastic film, sheet, fabric, or synthetic paper. For structurally flexible devices, plastic substrates such as polyester, polycarbonate, polyimide sheets, polyethylene terephthalate (PET) sheet, polyethylene naphthalate (PEN) sheet, and the like, may be used. The thickness of the substrate can be any suitable thickness, such as about 10 micrometers to over 10 millimeters with an exemplary thickness being from about 50 micrometers to about 2 millimeters, especially for a flexible plastic substrate, and from about 0.4 to about 10 millimeters for a rigid substrate such as glass or silicon.

The interlayer of the present device is formed from a composition in accordance with the present disclosure comprising a polyvinyl butyral resin; a melamine resin, such as a poly(melamine-co-formaldehyde) based polymer; an anhydride, an optional epoxy resin; an optional surfactant; and an optional catalyst.

The interlayer may be disposed on the substrate using any suitable method. For example, the present composition may be disposed on the substrate by solution depositing. Solution depositing as used herein refers to a process whereby a liquid is deposited upon the substrate to form a coating or layer. Solution depositing includes, for example, one or more of spin coating, dip coating, spray coating, slot die coating, flexographic printing, offset printing, screen printing, gravure printing or ink jet printing the interlayer composition onto the substrate.

In some embodiments, the interlayer is a film. The film formed from the instant composition may be present on the substrate at any suitable or desired thickness. In some embodiments, the dried film thickness of the interlayer is from about 0.2 to about 5 micrometers, or from about 0.5 to about 3 micrometers, or from about 0.75 to about 1 micrometers. In a specific embodiment, the coating thickness of the interlayer is from about 0.2 to about 1 micrometer. Typically, the film formed from the compositions of the disclosure does not contain polyvinyl phenol.

In some embodiments, the interlayer, which is disposed on the substrate, is cured. The interlayer can be cured at any suitable or desired temperature for any suitable period of time. In some embodiments, the interlayer disposed on the substrate can be cured at a temperature of from about 80° C. to about 200° C., or from about 100° C. to about 180° C., or from about 120° C. to about 160° C. for a period of from about 0.5 to about 6 hours, or from about 1 to about 4 hours, or from about 2 to about 3 hours. In embodiments, the present composition can be cured at about 160° C. for about 6 hours or at about 200° C. for about 0.5 hours.

In some embodiments, the resulting interlayer, after curing, provides a film having balanced properties for printing electronics including a suitable water contact angle for controlling ink wettability, surface smoothness, suitable glass transition for controlling the flexibility for flexible electronics fabrications, electrical insulating properties and other properties as described herein. In some embodiments, the cured film possesses a water contact angle of from about 65 degrees to about 95 degrees. In some embodiments, the thermally cured film possesses a surface roughness of from about 1 nanometer to about 10 nanometers. In embodiments, the cured film has a glass transition temperature of from about minus 10° C. to about 100° C.

In some embodiments, the device includes a conductive material. Any suitable or desired conductive material can be used to form conductive features on the present device. Typically, a conductive composition, such as a metal ink composition, is used to provide the conductive features. Suitable metal ink compositions are described in U.S. Pat. No. 8,324,294 and U.S. Patent Publication 2014/0312284, which are each herein incorporated by reference in their entireties, and which include, for example, silver nanoparticles dispersed within an ink vehicle, such as aromatic hydrocarbons including benzene, toluene, xylene and ethylbenzene. The fabrication of conductive features, such as an electrically conductive element, from a metal ink composition, for example, from a nanoparticle metal ink, such as a nanosilver ink composition, can be carried out by depositing the nanosilver ink composition, for example, onto a substrate using any suitable deposition technique including solution processing as described herein at any suitable time prior to or subsequent to the formation of other layers on the substrate. Thus, deposition of the nanosilver ink composition, for example, onto the substrate can occur either on a substrate or on a substrate already containing layered material, for example, a substrate having disposed thereon the composition in accordance with the present disclosure.

In some embodiments, the conductive features are formed by heating the conductive composition. In some embodiments, prior to heating, the layer of the deposited conductive composition may be electrically insulating or may have very low electrical conductivity; however, heating results in an electrically conductive layer composed of annealed metal particles, for example, such as annealed silver nanoparticles, which increases the conductivity. In some embodiments, the annealed silver nanoparticles, for example, may be coalesced or partially coalesced silver nanoparticles. In other embodiments, it may be possible that in the annealed metal nanoparticles, for example, the silver nanoparticles, achieve sufficient particle-to-particle contact to form the electrically conductive layer without coalescence.

The deposited conductive composition, such as a metal ink composition, is heated to any suitable or desired temperature, such as from about 70° C. to about 250° C., or any temperature sufficient to induce annealing of the metal particles, for example, and thus form an electrically conductive layer, which is suitable for use as an electrically conductive element in electronic devices. The heating temperature is one that does not cause adverse changes in the properties of previously deposited layers or the substrate. In some embodiments, use of low heating temperatures allows use of low cost plastic substrates, which have an annealing temperature of below 140° C.

The heating can be for any suitable or desired time, such as from about 0.01 hours to about 10 hours. The heating can be performed in air, in an inert atmosphere, for example under nitrogen or argon, or in a reducing atmosphere, for example, under nitrogen containing from about 1 to about 20 percent by volume hydrogen. The heating can also be performed under normal atmospheric pressure or at a reduced pressure of, for example, about 1000 mbars to about 0.01 mbars.

Heating encompasses any technique that can impart sufficient energy to the heated material or substrate to anneal the metal nanoparticles, for example. These techniques include thermal heating (for example, at hot plate, an oven, and a burner), infra-red ("IR") radiation, laser beam, flash light, microwave radiation, or ultraviolet ("UV") radiation, or a combination thereof.

In some embodiments, after heating, an electrically conductive line, such as an electrically conductive silver line, is formed on the substrate that has a thickness ranging from about 0.1 to about 20 micrometers, or from about 0.15 to about 10 micrometers. In certain embodiments, after heating, the resulting electrically conductive line has a thickness of from about 0.1 to about 2 micrometers.

The conductivity of the conductive features, such as an electrically conductive line, which is produced by heating the deposited conductive composition is more than about 10,000 Siemens/centimeter (S/cm), more than about 50,000 S/cm, more than about 80,000 S/cm, more than about 100,000 S/cm, more than about 125,000 S/cm, more than about 150,000 S/cm or more than about 200,000 S/cm. Typically, the conductivity ranges from about 50,000 S/cm to about 200,000 S/cm, such as about 80,000 S/cm to about 150,000 S/cm, such as about 100,000 S/cm to about 125,000 S/cm.

The resistivity of the conductive features, such as an electrically conductive line, which is produced by heating the deposited conductive composition is less than about $1.0 \times 10^{-4}$ ohms-centimeter (ohms-cm), less than about $2.0 \times 10^{-5}$ ohms-cm, less than about $1.25 \times 10^{-5}$ ohms-cm, less than about $1.0 \times 10^{-5}$ ohms-cm, less than about $8.0 \times 10^{-6}$ ohms-cm, less than about $6.6 \times 10^{-6}$ ohms-cm or less than about $5.0 \times 10^{-6}$ ohms-cm. Typically, the resistance ranges from about $2.0 \times 10^{-5}$ ohms-cm to about $5.0 \times 10^{-6}$ ohms-cm, such as about $1.25 \times 10^{-5}$ ohms-cm to about $6.6 \times 10^{-6}$ ohms-cm, such as about $1.0 \times 10^{-5}$ ohms-cm to about $8.0 \times 10^{-6}$ ohms-cm.

The device of the present disclosure may be used for any suitable or desired application, such as for electrodes, conductive pads, interconnects, conductive lines, conductive tracks, and the like, in electronic devices such as thin film transistors, organic light emitting diodes, printed antenna, and other electronic devices requiring conductive elements or components.

Cured Film

Also provided herein is a cured film formed from a composition comprising a polyvinyl butyral represented by Formula I, a poly(melamine-co-formaldehyde) based polymer and an anhydride as described herein. Typically, the cured film is formed from the composition in accordance with the present disclosure that does not contain polyvinyl phenol.

In some embodiments, the cured film comprises conductive features, such as an electrically conductive line, as described herein. Typically, the conductivity of the conductive features of the cured film is more than about 10,000 Siemens/centimeter (S/cm), more than about 50,000 S/cm, more than about 80,000 S/cm, more than about 100,000 S/cm, more than about 125,000 S/cm, more than about 150,000 S/cm or more than about 200,000 S/cm. More typically, the conductivity of the cured film comprising the conductive features, such as an electrically conductive line, ranges from about 50,000 S/cm to about 200,000 S/cm, such as about 80,000 S/cm to about 150,000 S/cm, such as about 100,000 S/cm to about 125,000 S/cm.

In some embodiments, the resistivity of the conductive features, such as an electrically conductive line of the cured film is less than about $1.0 \times 10^{-4}$ ohms-centimeter (ohms-cm), less than about $2.0 \times 10^{-5}$ ohms-cm, less than about $1.25 \times 10^{-5}$ ohms-cm, less than about $1.0 \times 10^{-5}$ ohms-cm, less than about $8.0 \times 10^{-6}$ ohms-cm, less than about $6.6 \times 10^{-6}$ ohms-cm or less than about $5.0 \times 10^{-6}$ ohms-cm. Typically, the resistivity of the cured film comprising the conductive features, such as an electrically conductive line, ranges from about $2.0 \times 10^{-5}$ ohms-cm to about $5.0 \times 10^{-6}$ ohms-cm, such as about $1.25 \times 10^{-5}$ ohms-cm to about $6.6 \times 10^{-6}$ ohms-cm, such as about $1.0 \times 10^{-5}$ ohms-cm to about $8.0 \times 10^{-6}$ ohms-cm.

Methods

Also provided herein is a process for forming conductive features, such as an electrically conductive line as described herein, on a substrate including depositing an interlayer composition onto a substrate as described herein; curing the interlayer to form an interlayer film; depositing a conductive composition, such as a metal ink composition, onto the interlayer film to form deposited features; and heating the deposited features to form the conductive features as described herein. The conductive features can be fabricated by any suitable or desired method. In embodiments, the conductive features can be prepared by solution processing techniques such as ink jet printing on the substrates with a pre-applied interlayer. The conductive features show high conductivity with significantly improved adhesion after annealing at a suitable temperature.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Preparation of Interlayer Solution.

Interlayer composition Samples 1-3 were prepared using the components and amounts shown in Table 1. The interlayer components were prepared as follows. A 20% solution of poly(propylene glycol) diglycidyl ether (PLGDE) was prepared by mixing 20 grams of poly(propylene glycol) diglycidyl ether and 80 grams of propylene glycol monomethyl ether acetate (PGMEA) solvent in a glass bottle. A 10% polyvinyl butyral (PVB) solution was prepared by the slow addition of 10 grams polyvinyl butyral powder (PVB BUTVAR®-76) into 90 grams PGMEA solvent in a glass bottle, followed by mixing until the polyvinyl butyral powder was completely dissolved. Methylated poly(melamine co-formaldehyde) 84 weight percent solution in 1-butanol (PMMF) was obtained from Sigma-Aldrich, Inc. The average $M_n$ of the methylated poly(melamine co-formaldehyde) was ~432 Da.

Sample 1 was prepared by adding 2.5 grams of PLGDE into a vial, followed by the addition of 2 grams of PVB, 0.06 grams of PMMF and 0.1 grams acetic anhydride. The vial was placed on a vortex at a speed of 2000 revolutions per minute (rpm) for 10 seconds.

Sample 2 was prepared by adding 0.1 grams of acetic anhydride into a vial, followed by the addition of 2 grams of PGMEA, 2.0 grams of PVB and 0.2 grams of PMMF. The vial was placed on a vortex at a speed of 2000 rpm for 10 seconds.

Sample 3 was prepared by adding 5 grams of PLGDE into a vial, followed by the addition of 2 grams of PVB and 0.2 grams of PMMF and 0.2 grams of acetic anyhydride. The vial was placed on a vortex at a speed of 2000 rpm for 10 seconds.

Spin Coating and Curing Process

Samples 1-3 were each coated onto pre-cleaned microscope glass or polyethylene naphthalate (PEN) substrate using an SCS P6700 Spin-coater (Specialty Coating Systems, Inc., Indianapolis, Ind.). The coating speed was initially set at 100 rpm for 5 seconds and then increased up to 1600 rpm for 60 seconds. The formulations were pre-heated at 100° C. for 10 minutes, and then cured at temperatures from 160° C. to 200° C. Curing conditions for each of the formulations on glass or PEN substrates is described in Table 2, below.

Example 2

Silver Nanoparticle Ink Composition.

A silver nanoparticle ink was prepared as described in U.S. Patent Publication 2014/0312284, which is hereby incorporated by reference in its entirety. Briefly, the silver nanoparticle ink composition was prepared by mixing silver nanoparticle powders with a solvent mixture of bicyclohexane and phenylcyclohexane at a 3:2 ratio. The silver nanoparticles were 50 weight percent of the composition. After the silver nanoparticles were mixed into the solvents, the composition was filtered using a 1.0 μm syringe filter.

Example 3

Printing Process and Characterization

Figure 1B:
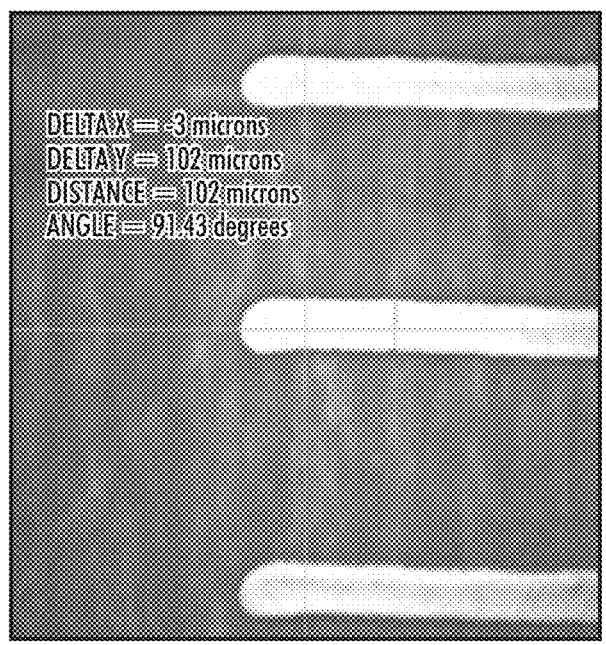
FIG. 1B depicts a printed silver ink line image on a glass substrate coated with a formulation of a composition in accordance with the present disclosure and as described in the examples.
Figure 2A:
FIG. 2A depicts a printed silver ink line image on an uncoated glass substrate.
Figure 2B:
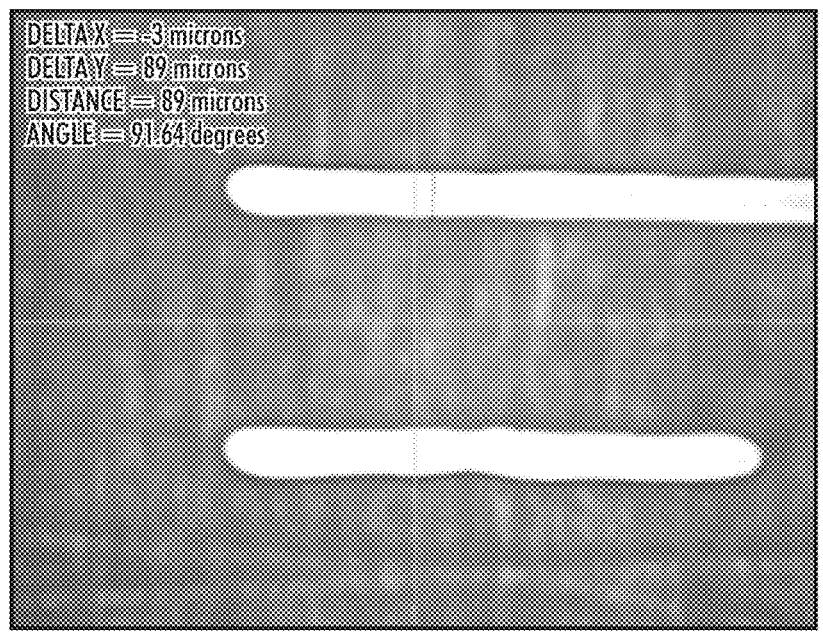
FIG. 2B depicts a printed silver ink line image on a glass substrate coated with a second formulation of a composition in accordance with the present disclosure and as described in the examples.
Figure 3A:
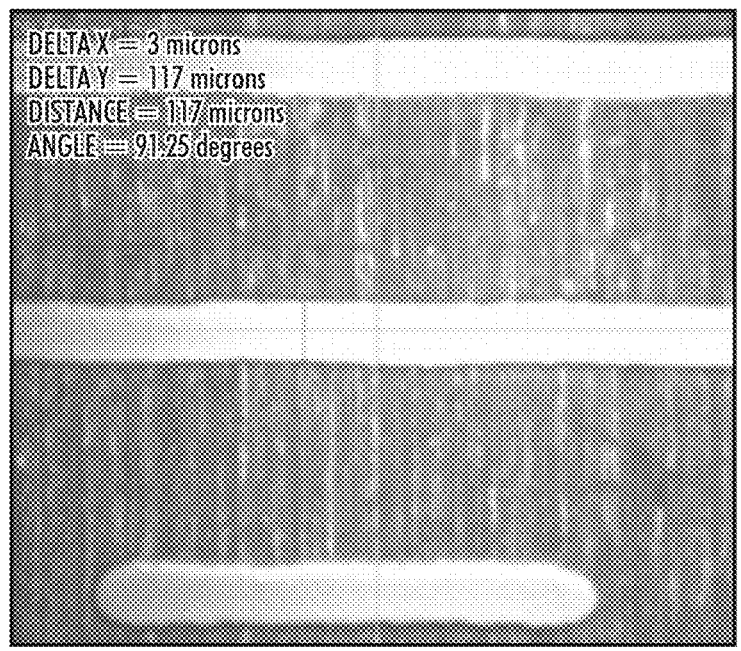
FIG. 3A depicts a printed silver ink line image on an uncoated polyethylene naphthalate (PEN) substrate.
Figure 3B:
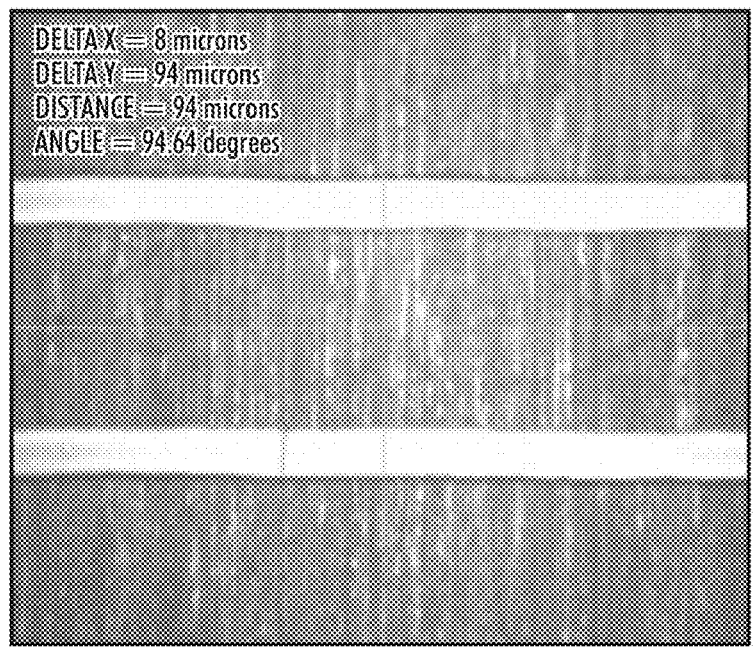
FIG. 3B depicts a printed silver ink line image on a PEN substrate coated with a composition in accordance with the present disclosure and as described in the examples.
Figure 4A:
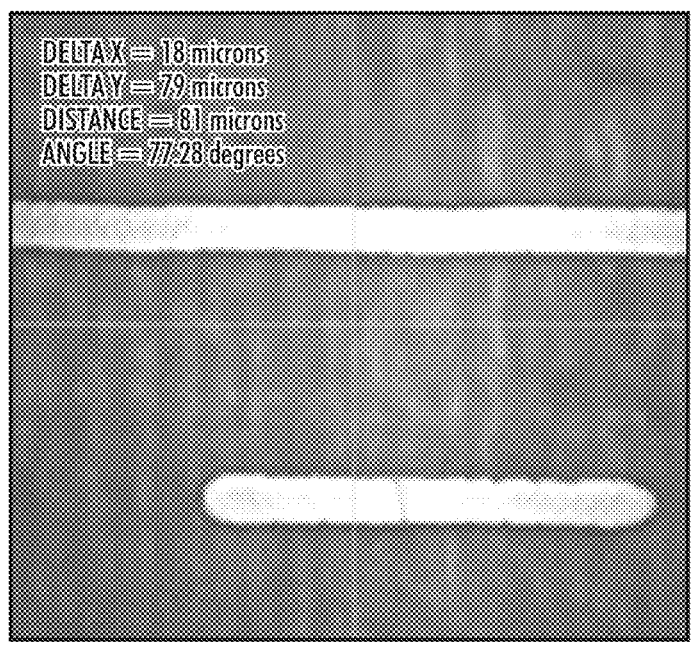
FIG. 4A depicts a printed silver ink line image on an uncoated glass substrate.
Figure 4B:
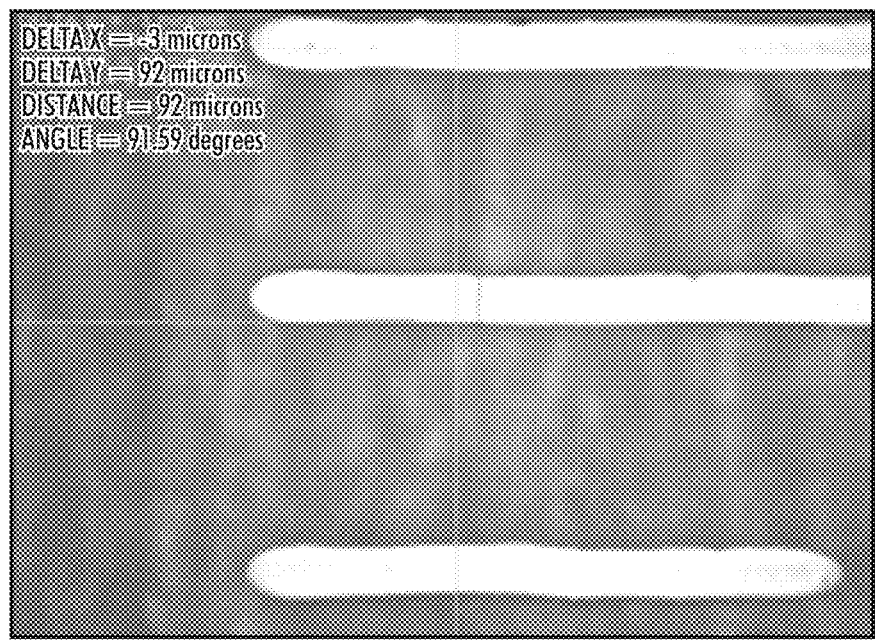
FIG. 4B depicts a printed silver ink line image on a glass substrate coated with a third formulation of a composition in accordance with the present disclosure and as described in the examples.

The silver nanoparticle ink described above was printed using a Dimatix DMP2800 (Fujifilm Diamtix, Inc., Lebanon, N.H.) equipped with 10 picoliter (pL) cartridge. All nozzles worked perfectly, forming spherical drops. Line widths of about 70-80 microns were printed onto uncoated and interlayer coated glass or PEN substrates. Curing was performed as described in Table 2, below. When printed on uncoated and interlayer coated glass, as shown in FIG. 1A (uncoated glass), FIG. 1B (interlayer coated glass, Sample 1), FIG. 2A (uncoated glass), FIG. 2B (coated glass, Sample 2), FIG. 4A (uncoated glass) and FIG. 4B (interlayer coated glass, Sample 3) or uncoated and interlayer coated PEN, as shown in FIG. 3A (uncoated PEN) and FIG. 3B (interlayer coated PEN, Sample 2), straight lines with uniform edges were obtained. No deformation in line shape was observed upon thermal sintering. All printed lines were highly conductive after annealing at about 120° C. for about 30 minutes.

Adhesion

Figure 5A:
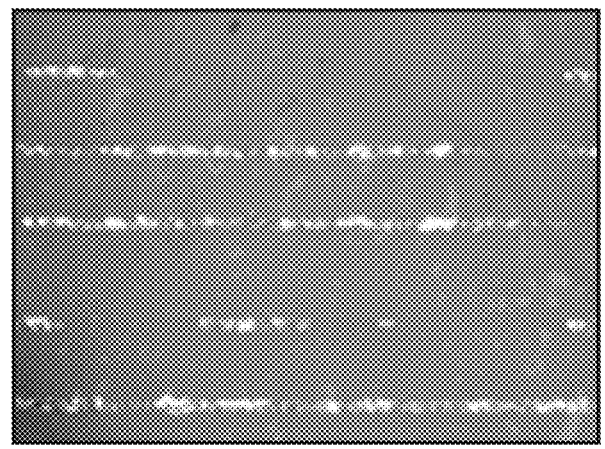
FIG. 5A depicts the transfer of ink lines to tape when ink lines were printed onto an uncoated glass substrate.
Figure 5B:
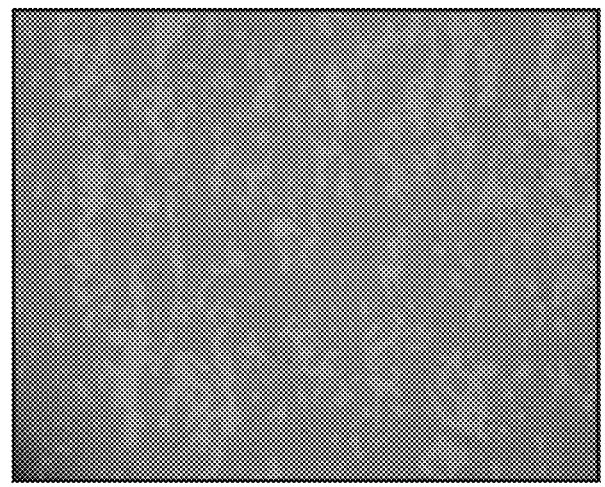
FIG. 5B depicts the lack of transfer of ink lines to tape when the ink lines were printed onto an interlayer coated glass substrate in accordance with the present disclosure and as described in the examples.

After printing and annealing at 120° C. for 30 minutes, the printed lines were subjected to an adhesion test by sticking SCOTCH® Magic™ Tape (3M) to the surface of the conductive lines, and then peeling the SCOTCH® Magic™ tape off of the surface. The peeled tape was attached to XEROX® 4200 paper. When no interlayer was used, the adhesion was very poor and a large amount of ink lines were peeled off as shown in FIG. 5A. In contrast, glass or PEN substrates, which were coated with any of interlayer Samples 1-3, demonstrated excellent adhesion. As shown in FIG. 5B,

TABLE 1

Summary of the Interlayer Formulations

| Sample ID | PLGDE[a] | PMMF[b] | PVB-76[c] | Acetic Anhydride | Solid (%) | PGMEA[d] | Total Weight |
|---|---|---|---|---|---|---|---|
| 1 | 10.73 | 1.29 | 4.29 | 2.15 | 18.45 | 81.55 | 4.7 |
| 2 |  | 4.65 | 4.65 | 2.31 | 11.61 | 88.39 | 4.3 |
| 3 | 13.51 | 2.70 | 2.70 | 2.70 | 21.62 | 78.38 | 7.4 |

[a] poly(propylene glycol) diglycidyl ether
[b] Poly(melamine-co-formaldehyde) methylated
[c] 10% polyvinyl butyral
[d] propylene glycol monomethyl ether acetate none of the silver ink lines were peeled off of glass coated with an interlayer composition prepared according to the present disclosure.

Conductivity

The conductivity was calculated based on the resistivity measurement. Resistivity=ohms×height×width/length, Conductivity=1/resistivity. The resistance of the printed line was measured using Keithley SCS-4200 (Tektronix, Inc., Beverton, Oreg.). Step height and width of the printed line were measured using a Bruker DektakXT Surface Profilometer.

The results, summarized in Table 2, below, show the higher conductivity printed on a surface comprising an interlayer of the present disclosure, in comparison to the conductivity on a bare glass substrate.

TABLE 2

Summary of Resistivity and Conductivity

| Sample ID | Substrates | Curing Condition | Conductivity S/cm |
|---|---|---|---|
| No coating | Glass | N/A | 9.34E+04 |
| Sample 1 | Glass | 200° C.-1.5 hours | 9.51E+04 |
| Sample 2 | Glass | 200° C.-1.5 hours | 1.19E+05 |
| Sample 2 | PEN | 160° C.-16 hours | 1.10E+05 |
| Sample 3 | Glass | 200° C.-1.5 hours | 1.18E+05 |

We claim:

1. A composition comprising a polyvinyl butyral represented by the following formula:

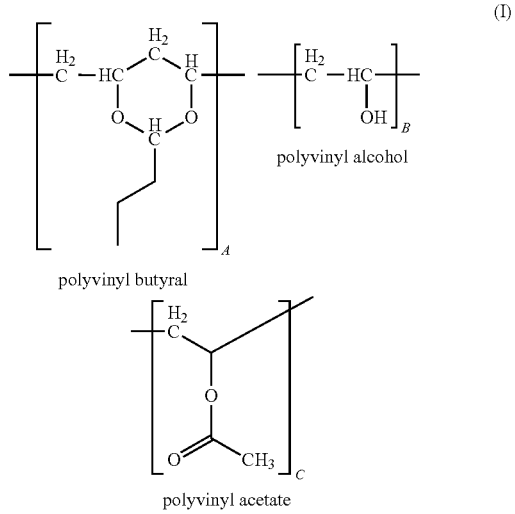

wherein A, B and C represent a proportion of corresponding repeat units expressed as a weight percent, wherein each repeat unit is randomly distributed along a polymer chain and wherein the sum of A, B and C is about 100 weight percent and wherein the polyvinyl butyral is present in the composition in an amount ranging from about 1% to about 20% based on a total weight of the composition;
a poly(melamine-co-formaldehyde) based polymer present in the composition in an amount ranging from about 0.5% to about 15%, based on a total weight of the composition, and
an anhydride.

2. The composition of claim 1, wherein A is independently from about 80 weight percent to about 88 weight percent; B is independently from about 11 weight percent to about 17.5 weight percent; and C is independently from about 0 weight percent to about 3 weight percent.

3. The composition according to claim 1, wherein an average molecular weight of the polyvinyl butyral ranges from about 25,000 Daltons to about 150,000 Daltons.

4. The composition according to claim 1, wherein the poly(melamine-co-formaldehyde) based polymer is selected from the group consisting of a methylated poly(melamine-co-formaldehyde) polymer, a butylated poly(melamine-co-formaldehyde) polymer, an isobutylated poly(melamine-co-formaldehyde) polymer, an acrylated poly(melamine-co-formaldehyde) polymer and a methylated/butylated poly(melamine-co-formaldehyde) polymer.

5. The composition according to claim 1, wherein the anhydride is selected from the group consisting of acetic anhydride, phthalic anhydride, fluorophthalic anhydride and an unsaturated dicarboxylic acid anhydride.

6. The composition according to claim 5, wherein the unsaturated dicarboxylic acid anhydride is selected from the group consisting of maleic anhydride, citraconic anhydride, itaconic anhydride and aconitic anhydride.

7. The composition according to claim 1, wherein the composition further comprises an epoxy resin.

8. The composition according to claim 7, wherein the epoxy resin comprises an aromatic group.

9. The composition according to claim 7, wherein the epoxy resin is selected from the group consisting of bisphenol A diglycidyl ether, bisphenol A propoxylate diglycidyl ether, trimethylolpropane triglycidyl ether, neopentyl glycol, diglycidyl ether, poly(propylene glycol) diglycidyl ether and tris-(hydroxyl phenyl)-methane-based epoxy.

10. The composition according to claim 1, wherein the composition does not contain polyvinyl phenol.

11. The composition according to claim 1, wherein the composition further comprises a surfactant and a catalyst.

12. A device comprising: a substrate; an interlayer; and conductive features,
wherein the interlayer comprises a thermally cured film formed from a composition comprising:
a polyvinyl butyral represented by the following formula:

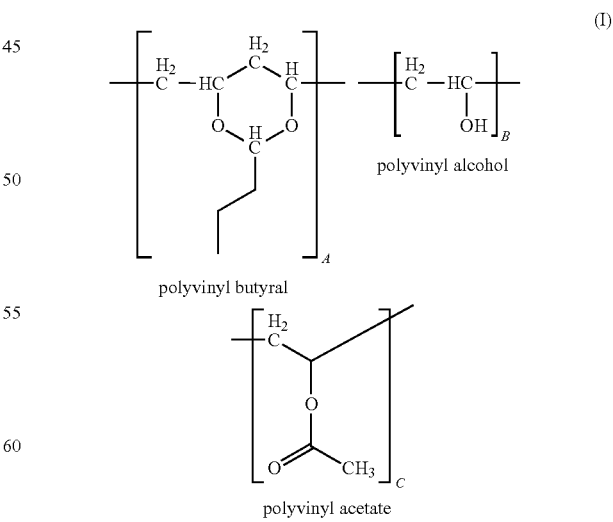

wherein A, B and C represent a proportion of corresponding repeat units expressed as a weight percent, wherein each repeat unit is randomly distributed along a polymer chain and wherein the sum of A, B and C is about 100 weight percent and wherein the polyvinyl butyral is present in the composition in an amount ranging from about 1% to about 20% based on a total weight of the composition;

a poly(melamine-co-formaldehyde) based polymer present in the composition in an amount ranging from about 0.5% to about 15%, based on a total weight of the composition, and an anhydride.

13. The device of claim 12, wherein A is independently from about 80 weight percent to about 88 weight percent; B is independently from about 11 weight percent to about 17.5 weight percent; and. C is independently from about 0 weight percent to about 3 weight percent.

14. The device of claim 12, wherein the substrate is selected from the group consisting of a polyethylene naphthalate substrate and a glass substrate.

15. The device of claim 12, wherein the conductive features comprise an electrically conductive element formed from a nanoparticle conductive ink composition.

16. The device of claim 15, wherein the nanoparticle conductive ink composition is a silver nanoparticle conductive ink composition.

17. The device of claim 12, wherein the composition does not contain polyvinyl phenol.

18. A cured film formed from a composition comprising a polyvinyl butyral represented by the following formula:

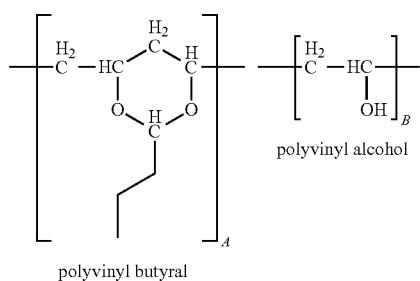

polyvinyl butyral

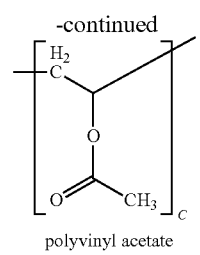

polyvinyl acetate wherein A, B and C represent a proportion of corresponding repeat units expressed as a weight percent, wherein each repeat unit is randomly distributed along a polymer chain and wherein the sum of A, B and C is about 100 weight percent and wherein the polyvinyl butyral is present in the composition in an amount ranging from about 1% to about 20% based on a total weight of the composition;

a poly(melamine-co-formaldehyde) based polymer present in the composition in an amount ranging from about 0.5% to about 15%, based on a total weight of the composition, and an anhydride, wherein the cured film comprises conductive features.

19. The cured film of claim 18, wherein a conductivity of the cured film ranges from about 50,000 S/cm to about 200,000 S/cm.

20. The cured film of claim 18, wherein a resistivity of the cured film ranges from about $2.0 \times 10^{-5}$ ohms-cm to about $5.0 \times 10^{-6}$ ohms-cm.

* * * * *